Jan. 6, 1970  C. D. NEUENSCHWANDER  3,488,007
GRAIN SCATTERER

Filed Dec. 7, 1967  2 Sheets-Sheet 1

INVENTOR
CHARLES D. NEUENSCHWANDER
BY
Hood, Gust & Irish
ATTORNEYS

United States Patent Office 3,488,007
Patented Jan. 6, 1970

3,488,007
GRAIN SCATTERER
Charles D. Neuenschwander, Indianapolis, Ind., assignor to Farm Fans, Inc., Indianapolis, Ind., a corporation of Indiana
Filed Dec. 7, 1967, Ser. No. 688,789
Int. Cl. A01c *17/00*
U.S. Cl. 239—687          4 Claims

ABSTRACT OF THE DISCLOSURE

A scatterer comprising a hopper for receiving particulate materials, a shaft generally aligned with the lower, open end of the hopper, means for driving the shaft, a plate disposed below the hopper to receive such material, the plate being provided with generally upwardly extending flange means arranged along two opposing sides thereof, and means for connecting the plate to the shaft for rotation therewith. The means connecting the plate to the shaft is arranged to permit adjustment of the plate about an axis perpendicular to the shaft and cocking of the plate relative to the shaft to elevate one flange means relative to the other flange means. Preferably, the plate is in the form of a parallelogram and one flange means is tapered downwardly toward the front side of the plate and the other flange means is tapered downwardly in the opposite direction toward the rear side of the plate.

BACKGROUND OF THE INVENTION

Field of the invention

The present invention relates to scattering apparatus, and more particularly to the provision of a scatterer which is arranged to scatter uniformly particulate material which is deposited thereinto. The scatterer of the present invention finds particular utility in the scattering of grain in a storage bin.

SUMMARY OF THE INVENTION

The present invention comprises a hopper for receiving particulate material such as grain. The hopper, which is preferably a conically-shaped funnel, is arranged to be mounted at the top of a storage bin, preferably in the center thereof. A driven shaft is generally aligned with the lower, open end of the hopper and a plate is disposed below the hopper to receive such particulate material, the plate being provided with generally upwardly extending flange means arranged along two opposing sides thereof. Means for connecting the plate to the shaft for rotation therewith is provided, such connecting means comprising means for rockably adjusting the plate about an axis generally perpendicular to the shaft and for cocking the plate relative to the shaft to elevate one of the flange means relative to the other of the flange means.

Preferably, the plate is in the form of a parallelogram and the one flange means is tapered downwardly toward the front side of the plate and the other flange means is tapered downwardly in the opposite direction toward the rear side of the plate. At least one generally upwardly extending vane-like element is disposed near the front side of the plate and means is provided for connecting this element to the plate for pivotally adjustable movement about an axis generally perpendicular to the plate. Preferably, the means connecting the vane-like element to the plate is disposed intermediate the ends of the element so that the rear end of the element is swingable toward the one flange means, this one flange means being hereinafter referred to as the "throwing flange."

Further, preferably, the scatterer of this invention comprises at least one other generally upwardly extending vane-like element disposed near the rear side of the plate and means for connecting this element to the plate for pivotally adjustable movement about an axis generally perpendicular to the plate. This last-mentioned element is arranged selectively to block a portion of the space between the flange means, thereby controllably to impede the flow of particulate material over the rear side.

In the illustrative embodiment of the present invention, the means for connecting the plate to the shaft comprises a member carried by the shaft and extending generally perpendicular thereto, a pair of U-bolts engaged with the member with their threaded ends extending downwardly therefrom, and nuts associated with the U-bolts. The threaded ends of the U-bolts extend through elongated slots formed in the plate and the nuts engage the bottom of the plate to hold it against the member carried by the shaft. The slots are formed about the center of the plate and the axis of the shaft extends through this center so that twisting of the plate results in a cocking action which elevates one flange means relative to the other flange means. It will be apparent as this description progresses that the throwing flange is raised and lowered by such a twisting action to determine the point on the top edge of the flange at which the material will begin to spill over.

It is an object of the present invention, therefore, to provide a scatterer which is ideally suited for scattering grain in a storage bin.

Another object of the present invention is to provide such a scatterer comprising a driven plate which is proportioned and arranged uniformly to scatter particulate material regardless of where the material is deposited on the plate.

A further object of the present invention is to provide means for connecting such a plate to a driving shaft, which means is arranged to permit adjustment of the plate about an axis perpendicular to the shaft and cocking of the plate relative to the shaft to elevate one flanged side of the plate relative to an opposing flanged side of the plate.

The above-mentioned and other features and objects of this invention and the manner of attaining them will become more apparent and the invention itself will be best understood by reference to the following description of an embodiment of the invention taken in conjunction with the accompanying drawings wherein:

DESCRIPTION OF THE PREFERRED EMBODIMENT

Figures 1, 2:
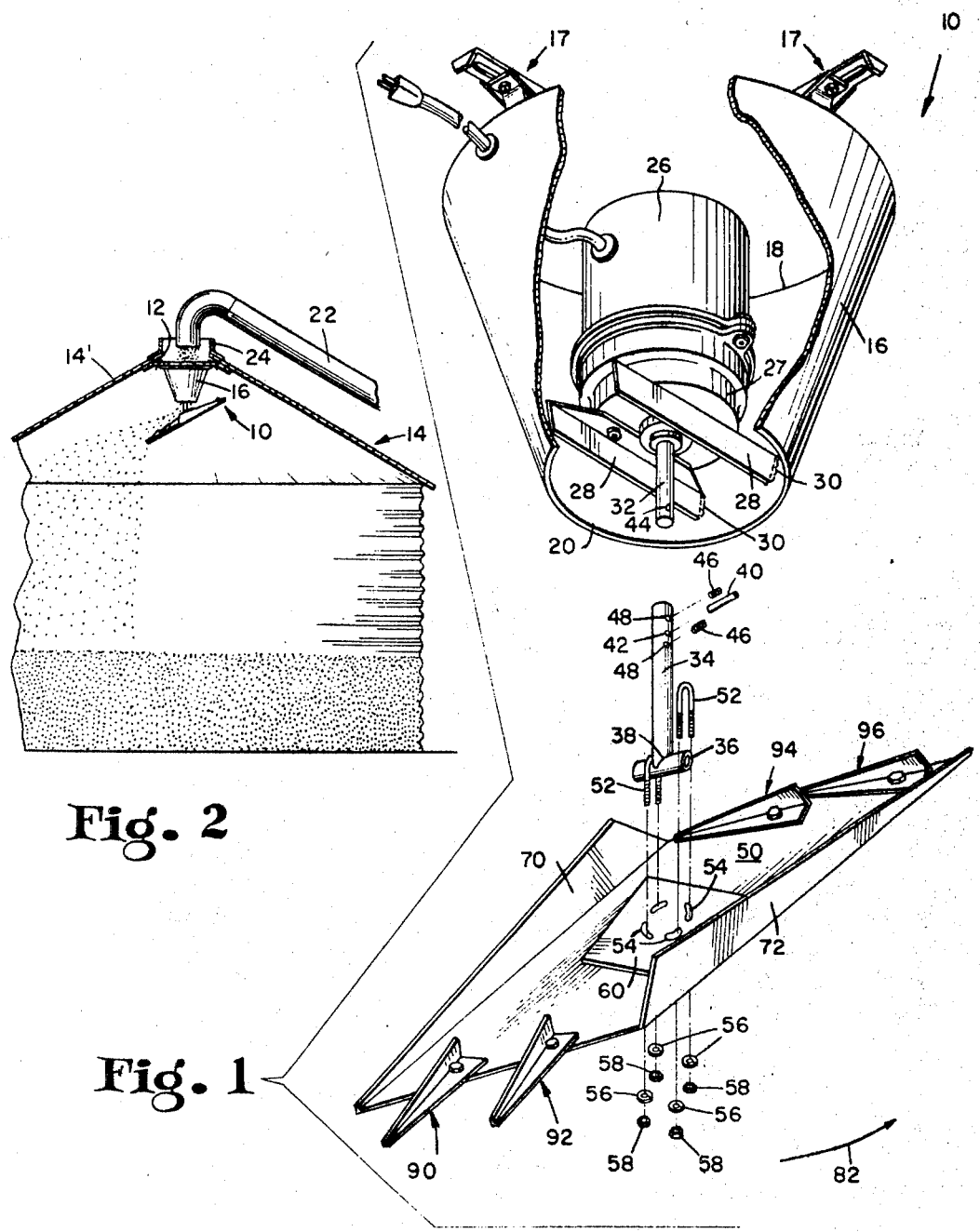
FIG. 1 is an exploded, perspective view of a scatterer constructed in accordance with the principles of the present invention.
FIG. 2 is a fragmentary, sectional view showing the scatterer installed in a conventional grain bin.

Referring to the drawings, it will be seen that there is illustrated a scatterer, indicated generally by the reference numeral 10, which is arranged to be mounted beneath the upper, central opening 12 of a conventional grain bin, indicated generally by the reference numeral 14. Specifically, the scatterer 10 comprises a funnel-like frusto-conical hopper 16 which is mounted by means of adjustable hangers, indicated generally by the reference numeral 17, to be below and aligned with the opening 12, the hopper 16 having an open upper end 18 and an open lower end 20. Grain is deposited into the hopper 16 through a conventional conduit 22 (FIG. 2) which may include an auger or some other such means for elevating the grain to the top of the bin 14. In the illustrative embodiment of FIG. 2, an annular shield 24 is mounted above the opening 12 and the hopper 16 to direct the brain downwardly into the hopper.

A conventional drive motor 26 and its associated gear box 27 are mounted in the hopper 16 by a pair of braces 28 which extend across the lower end of the hopper and which are welded to the conical wall of the hopper as indicated at the reference numerals 30. The output shaft 32 of the gear box 27, which shaft preferably is axially aligned with the hopper 16, extends downwardly through the open end 20 of the hopper 16. In one embodiment of the present invention, the motor 26 and gear box 27 are arranged so that the shaft 32 rotates at a speed of 170 r.p.m. It will be understood, however, that the scatterer can be operated at any suitable speed. In some cases, it may be desirable to provide a two-speed motor or a variable-speed motor because the scatterer is desirably driven faster when the grain level approaches the top of the bin than it is when the grain level is near the bottom of the bin.

In the illustrative embodiment, a sleeve 34 having a transverse member 36 welded or otherwise securely fastened to its lower end, as indicated at 38, is mounted on the output shaft 32 and is secured thereto by means of the illustrative pin 40 which extends transaxially through an opening 42 in the sleeve 34 and an opening 44 in the shaft 32. Also, as illustrated, set screws 46 are threaded into openings 48 in the sleeve 34 to engage the shaft 32 as additional means for securing the sleeve 34 on the shaft 32. The transverse member 36 is preferably a cylindrical shaped rod member having an axis generally perpendicular to the axis of the sleeve 34 which is coincident with the axis of the shaft 32.

A scattering plate 50 is connected to the transverse member 36 by means of the illustrated U-bolts 52 which are engaged with the member 36 so that their threaded ends extend downwardly through elongated slots 54 in the plate 50. Washers 56 and nuts 58 are associated with the U-bolts 52 to hold the plate 50 upwardly against the transverse member 36. In the illustrative embodiment, a stiffening plate 60 is welded or otherwise securely fastened to the center of the plate 50. Of course, the plate 60 must be provided with elongated slots, each of which is superimposed above an elongated slot 54 in the plate 50.

Figure 3:
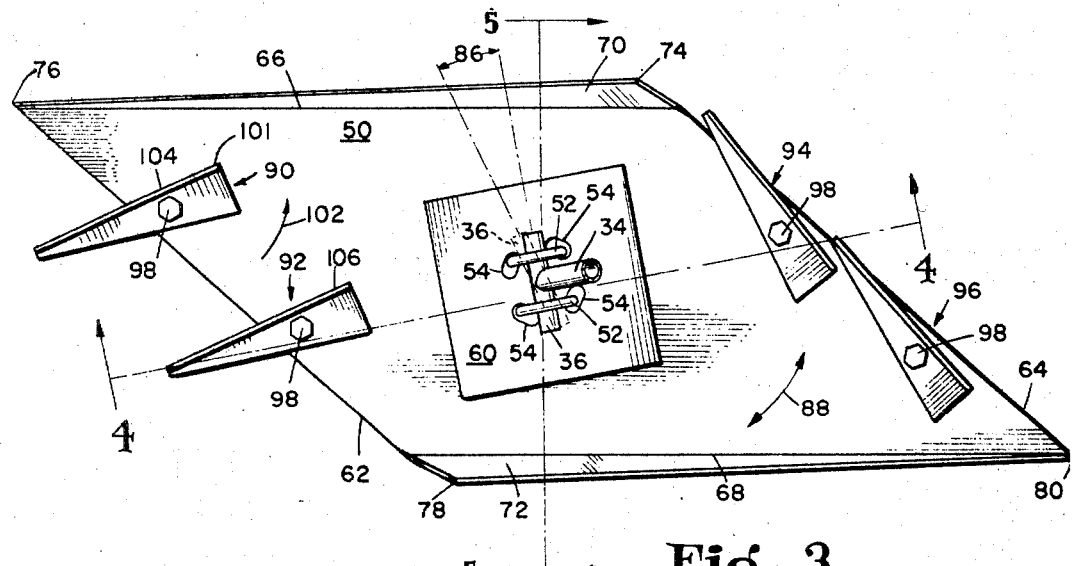
FIG. 3 is a top view of the driven plate of the scatterer.

As clearly shown in FIG. 3, the plate 50 is formed as a parallelogram having a front end 62, rear end 64 and opposing sides 66 and 68. A flange 70 is turned up from the side 66 and a flange 72 is turned up from the side 68. Preferably, the plate 50 and its flanges 70 and 72 are formed from a single sheet of metal and the flanges 70 and 72 are turned upwardly at an angle of approximatey 75° relative to the surface of plate 50. It will be apparent, however, that the flanges 70 and 72 may be provided by welding or otherwise securely fastening flange elements on the sides 66 and 68 of the plate 50 and that the angle between such flange elements and the plate is not critical.

The flange 70 is tapered from its highest point 74 adjacent the rear end 64 toward its lowest point 76 adjacent the front end 62 and the flange 72 is tapered from its highest point 78 adjacent the front end 62 toward its lowest point 80 adjacent the rear end 64. It will be apparent that the plate 50 is symmetrical and that, depending on the direction of rotation of the plate, either flange 70, 72 can be the throwing flange, i.e., the flange which engages the material deposited onto the plate to hurl the material generally radially outwardly. In the illustrative embodiment, the front end of the plate 62 is tilted downwardly as suggested in FIGS. 1, 2 and 4 and the plate is rotated counterclockwise as suggested by the arrow 82 in FIG. 1 so that the flange 70 is the throwing flange.

Figure 4:
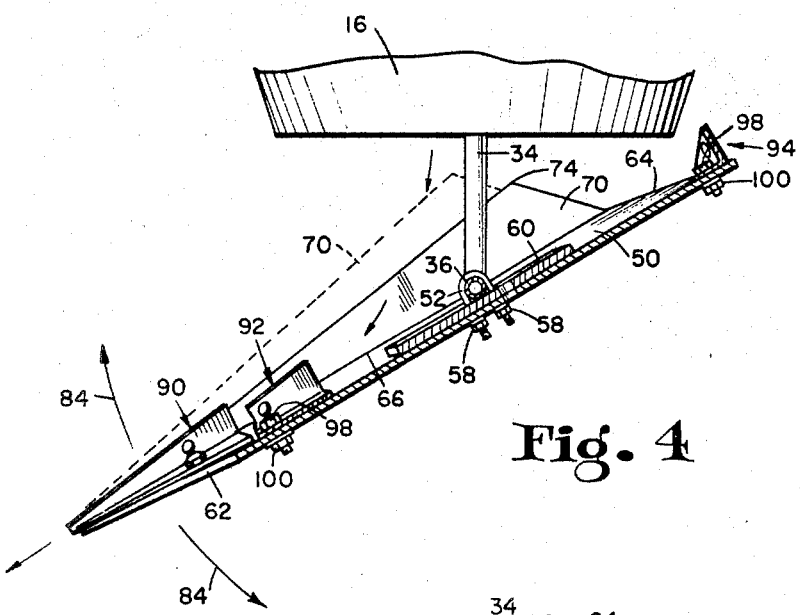
FIG. 4 is a sectional view taken from FIG. 3 generally along the line 4—4.
Figure 5:
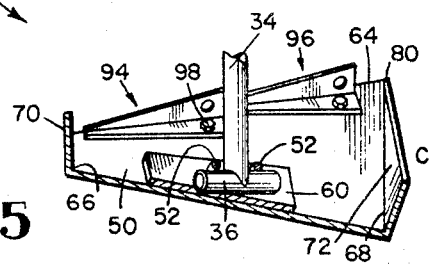
FIG. 5 is a sectional view, slightly reduced, taken from FIG. 3 generally along the line 5—5.

When the nuts 58 are slightly loosened, the plate 50 can be rockably adjusted about the axis of the transverse member 36 as suggested by the arrows 84 in FIG. 4. Further, since the threaded ends of the U-bolts 52 extend through the elongated slots 54, when the nuts 58 are slightly loosened, the plate 50 can be twisted about the axis of the sleeve 34 as indicated by the angle 86 between the solid-line drawing of the member 36 and the dash-line drawing of the member in FIG. 3. Preferably, the slots 54 are long enough to permit the plate to be twisted approximately 20° about the axis of the sleeve 34.

It will be apparent that, when the front end 62 is tilted downwardly relative to the rear end 64 as shown in FIG. 4, twisting of the plate about the axis of the sleeve 34 as suggested by the arrow 88 in FIG. 3 will cock the plate 50 relative to the axis of the sleeve 34 so that one flange 68, 70 is elevated relative to the other flange. The amount which the flange 70 can be elevated by such a cocking action is indicated by the dashed outline of the flange 70 in FIG. 4. Since the flange 70, in the illustrative embodiment, is the throwing flange, it will be apparent that, when the flange is elevated as suggested in FIG. 4, less material falling onto the plate 50 from the hopper 16 will tend to spill over the flange 70 and more of the material will be directed along the flange and off the front end 62 to be thrown farther radially in the bin 14. Thus, by controlling the amount of material which spills over the top of the flange 70, i.e., the point on the flange at which the material starts to spill over, the distribution of the material in the bin 14 can be controlled. The reason for this is that the material spilling over the flange 70 adjacent the point 74 will have less radial acceleration than the material which spills over the flange 70 near the point 76 or which spills over the end 62 adjacent the point 76.

Many conventional grain bins, such as the grain bin 14, are 36 feet or more in diameter and, consequently, the grain deposited into the bin through the opening in the center of its roof must be thrown radially outwardly approximately 18 feet. In such a bin, it is necessary thus to cock the plate 50 to elevate the throwing flange 70 so that more grain is thrown along the inside surface of the flange 70 and less grain is spilled over the top edge of the flange 70.

In order to distribute the grain uniformly between the outer perimeter of the bin and the center of the bin, a pair of vane-like guides 90 and 92 is disposed near the front end 62 and in order to control the distribution of the grain at the center of the bin, a pair of vane-like guides 94 and 96 is disposed adjacent the rear end 64. Although in the illustrative embodiment, the guides 90, 92, 94 and 96 are identical, it will be understood that this is only a manufacturing convenience and that the guides 90 and 92 serve one purpose and the guides 94 and 96 serve another and distinct purpose. Specifically, each of the guides 90, 92, 94, 96 is connected to the plate 50 by means such as the illustrated screws 98 and nuts 100 for pivotally adjustable movement about an axis generally perpendicular to plate 50. It will be seen that the screws 98 are disposed intermediate the ends of their respective guides 90, 92, 94 and 96.

The purpose of the guides 90 and 92 is to deflect the grain deposited onto the plate 50 so that the grain will fall uniformly between the outer perimeter of the bin and the center of the bin. The guide 92 will tend to distribute the grain in an annular pattern about the center of the bin and the guide 90 will tend to distribute the grain in a larger annular pattern about the center of the bin. As shown in FIG. 3, the rear end 101 of the guide 90 can be swung in the direction of the arrow 102 toward the flange 70 to intercept the grain moving therealong to cause such grain to move along the generally upwardly extending flange portion 104 of the guide 90. Similarly, the rear end 106 of the guide 92 is swingable toward the guide 90.

The purpose of the guides 94 and 96 is to control the amount of grain spilling over the rear end 64 which, in the illustrative embodiment, is the high side of the plate 50. The guides 94 and 96, therefore, act as gates for blocking a portion of the space along the rear end 64 between the flanges 70 and 72. The grain which spills over the rear end 64 fills the center of the bin. It will be apparent that the gate 94 is disposed lower than the gate 96 and, therefore, the gate 94 will provide more control over the amount of grain spilling over the rear end 64 to fill the center of the bin.

In recapitulation, the distribution of particulate material by the scatterer 10 can be controlled by rockably adjusting the plate 50 about the axis of the member 36, cocking the plate 50 relative to the axis of the sleeve 34 to raise or lower the throwing flange 70, adjusting the guides 90 and 92 and adjusting the guides 94 and 96. In most cases, in a bin such as that shown in FIG. 2, the greatest throw is obtained by tilting the plate 50 to the point where most of the grain leaving the plate just clears the conical roof 14'. Thus, a scatterer 10 comprising a single-speed motor 26 can be placed in a conventional bin and adjusted so that material deposited in the bin will be uniformly distributed.

One advantage of the scatterer 10 is that the material deposited into the hopper 16 will be uniformly distributed regardless of how the material falls onto the plate 50. That is, it is not necessary for the material to fall from the center of the hopper 16 onto the center of the plate 50 and, in fact, the material can fall down one side portion of the hopper 16 onto the plate 50 and still be evenly distributed. This advantage is obtained by the unique construction of the plate 50 and its flanges 70 and 72 and by the manner in which the plate is connected to the sleeve 34.

A scatterer constructed in accordance with the present invention and having a one-fourth horsepower motor 26 and a gear box 27 providing a shaft 32 speed of 170 r.p.m. is capable of uniformly scattering 2,000 to 2,700 bushels of grain per hour in bins having diameters in excess of 36 feet.

While there have been discussed above the principles of this invention in conjunction with specific apparatus, it is to be clearly understood that this description is made by way of example and not as a limitation to the scope of the invention.

What is claimed is:

1. A scatterer comprising a hopper for receiving particulate materials, a shaft generally axially aligned with the lower open end of said hopper, means for driving said shaft, a plate disposed below said hopper to receive such material therefrom and having at least two generally opposing sides, generally upwardly extending flange means respectively arranged along said two opposing sides of said plate, and means for connecting said plate to said shaft for rotation therewith, said connecting means comprising, a member carried by said shaft and extending generally perpendicular thereto, a pair of U-bolts engaged with said member with their ends extending downwardly therefrom, said plate being provided with elongated apertures for receiving the ends of said U-bolts, and fastening means associated with said U-bolts and engaging the bottom surface of said plate to hold said plate against said member.

2. A scatterer as in claim 1 wherein said elongated slots are formed about the center of said plate, and wherein the axis of said shaft extends substantially through the center of said plate.

3. A scatterer comprising a hopper for receiving particulate materials, a shaft generally axially aligned with the lower open end of said hopper, means for driving said shaft, a plate disposed below said hopper to receive such material therefrom and having at least two generally opposing sides, generally upwardly extending flange means respectively arranged along said two opposing sides of said plate, and means for connecting said plate to said shaft for rotation therewith, said driving means being a motor disposed inside of said hopper, said shaft being coupled to the operating shaft of said motor, said shaft being arranged to extend downwardly through the lower end of said hopper, the axis of said shaft extending substantially through the center of said plate, said plate being formed as a parallelogram defined by said two opposing sides and by two opposing ends, said one flange means being tapered downwardly toward one end of said plate, said other flange means being tapered downwardly in the opposite direction toward the other end of said plate, a first generally upwardly extending vane-like element disposed near said one end of said plate and means for connecting said first vane-like element to said plate for pivotally adjustable movement about an axis generally perpendicular to said plate, the rear end of said first element means being movable toward and away from said one flange means and the front end of said first element being movable outwardly beyond said one end, a second generally upwardly extending vane-like element disposed near the other end of said plate and means for connecting said second element to said plate for pivotally adjustable movement about an axis generally perpendicular to said plate, said second element being arranged selectively to block a portion of the space between said flange means, thereby controllably to impede the flow of such material over said other end, said connecting means comprising a member carried by said shaft and extending generally perpendicular thereto, a pair of U-bolts engaged with said member with their threaded ends extending downwardly therefrom, said plate being provided with elongated apertures for receiving the ends of said U-bolts, and nuts associated with said U-bolts and engaging the bottom surface of said plate to hold said plate against said member, said slots being formed about the center of said plate.

4. A scatterer comprising a shaft, means for driving said shaft, a scattering plate having at least two opposing sides, generally upwardly extending flange means respectively arranged along said two opposing sides of said plate, and means for connecting said plate to said shaft for rotation therewith, said connecting means comprising a member carried by said shaft and extending generally perpendicular thereto, a pair of U-bolts engaged with said member with their ends extending downwardly therefrom, said plate being provided with elongated apertures for receiving the ends of said U-bolts, and fastening means associated with said U-bolts, and engaging the bottom surface of said plate to hold said plate against said member.

References Cited

UNITED STATES PATENTS

| 2,040,506 | 5/1936 | Tiesberg | 302—60 |
| 3,248,117 | 4/1966 | Donelson | 214—17.64 XR |
| 3,282,591 | 11/1966 | Donelson | 214—17.64 XR |

ROBERT G. SHERIDAN, Primary Examiner

U.S. Cl. X.R.

214—17